United States Patent [19]

Dotson et al.

[11] Patent Number: 4,472,254

[45] Date of Patent: Sep. 18, 1984

[54] ELECTRIC PLASMA DISCHARGE COMBUSTION SYNTHESIS OF CHLORINE DIOXIDE

[75] Inventors: Ronald L. Dotson, Cleveland; George W. Geren, Georgetown, both of Tenn.

[73] Assignee: Olin Corporation, New Haven, Conn.

[21] Appl. No.: 490,811

[22] Filed: May 2, 1983

[51] Int. Cl.$^3$ .............................................. B01J 1/10
[52] U.S. Cl. .................................... 204/164; 423/473
[58] Field of Search ................. 204/164; 423/472, 473

[56] References Cited

U.S. PATENT DOCUMENTS

| | | | |
|---|---|---|---|
| 2,092,945 | 9/1937 | Vincent | 423/472 |
| 2,689,217 | 9/1954 | Cotton | 204/164 |
| 3,429,793 | 2/1969 | Hellund | 204/157.1 |
| 3,444,061 | 5/1969 | Hellund | 204/164 |
| 3,450,617 | 6/1969 | Hellund | 204/164 |

*Primary Examiner*—John F. Niebling
*Attorney, Agent, or Firm*—James B. Haglind; Donald F. Clements

[57] ABSTRACT

A process for the production of chlorine dioxide comprises feeding an inert gas to a reaction zone and applying an electrical discharge to the inert gas to produce a high temperature plasma. Chlorine gas and oxygen gas are supplied simultaneously to the reaction zone and reacted in the plasma to produce a gaseous mixture comprised of chlorine dioxide, chlorine, oxygen and inert gas, the molar ratio of oxygen to chlorine in the reaction zone being at least about 2.5:1. The gaseous mixture is recovered from the reaction zone. Chlorine dioxide, which may be recovered as a gas or reacted to produce an alkali metal chlorite, is employed as a bleaching agent and a water treatment agent.

22 Claims, 3 Drawing Figures

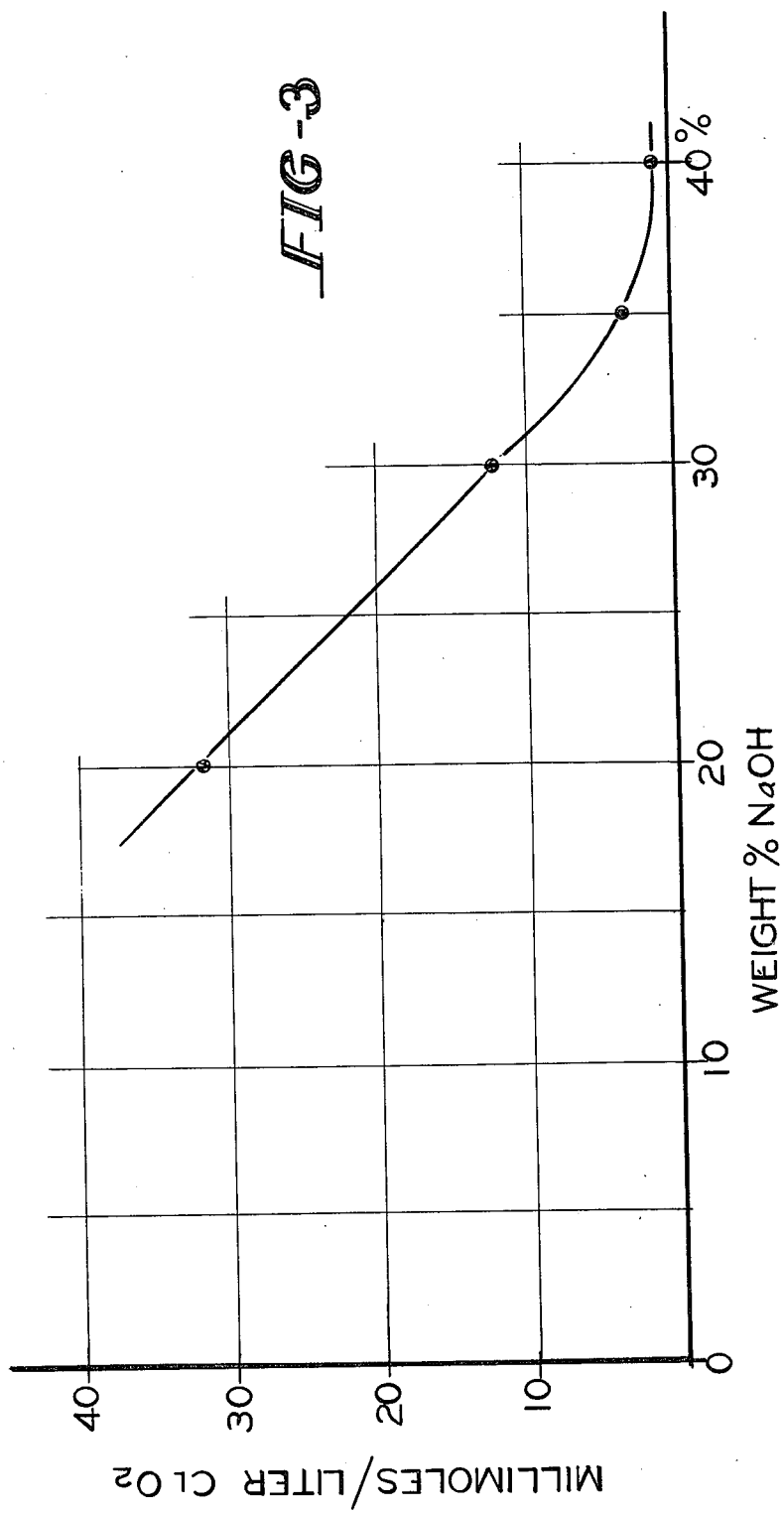

ELECTRIC PLASMA DISCHARGE COMBUSTION SYNTHESIS OF CHLORINE DIOXIDE

This invention relates to the production of chlorine dioxide. More particularly, this invention relates to the production of chlorine dioxide from chlorine and oxygen gases.

Chlorine dioxide is employed in commercial applications such as the disinfection of drinking water and swimming pool water; bleaching operations including the bleaching of wood pulp, wool, cellulosic and synthetic fibers, as well as in the treatment of flour and food products.

At present, chlorine dioxide is commercially produced by the reduction of an alkali metal chlorate or an alkali metal chlorite in an acid medium. It is desirable, however, to find a more energy efficient, less capital intensive method of producing chlorine dioxide for example, by the direct synthesis from chlorine and oxygen gases.

Previous attempts to produce chlorine dioxide by the direct combination of chlorine and oxygen gases include that of W. J. Cotton described in U.S. Pat. No. 2,689,217 published Sept. 14, 1954, in which the gases were passed through an electric discharge maintained under condition in which the development of appreciable amounts of heat and light were prevented. The process employed subatmospheric gas pressures and frequencies in the range of from about 10 to about 10,000 cycles per second where the electric discharge ranged from a non-luminous dark discharge to a luminous glow discharge. Conversion rates of chlorine to chlorine dioxide of up to about 16 percent were obtained.

U.S. Pat. No. 3,429,793, issued Feb. 25, 1969 to E. J. Hellund, describes a process in which oxygen was reacted with liquid chlorine in a glow discharge in which the total gas pressure was in the range of 5 to 25 millimeters of mercury while maintaining the reaction temperature in the range of $-35°$ to $-120°$ C. or lower. Extensive refrigeration means are required as well as vacuum means; thereby requiring large capital investments. Apparatus for conducting this process is described in U.S. Pat. Nos. 3,444,061 issued May 13, 1969 and 3,450,617 issued June 17, 1969 to Mr. Hellund.

There is, however, need for a continuous process for directly producing chlorine dioxide under conditions in which it is effectively separated and recovered as a pure product suitable for direct commercial application.

It is an object of the present invention to provide a process for the production of chlorine dioxide from chlorine and oxygen gases which is carried out at atmospheric pressure.

An additional object of the present invention is to provide a continuous process for the production of chlorine dioxide in which the chlorine dioxide is effectively separated from gaseous reactants and recovered.

An additional object of the present invention is to provide a process for the continuous production of an alkali metal chlorite.

These and other objects of the present invention are accomplished in a process for the production of chlorine dioxide which comprises:

(a) feeding oxygen gas to a reaction zone;
(b) applying an electrical discharge to said oxygen gas to produce a high temperature plasma;
(c) supplying chlorine gas to said reaction zone and reacting said chlorine gas with said oxygen gas in said plasma to produce a gaseous mixture comprised of chlorine dioxide, chlorine, and oxygen, the molar ratio of oxygen to chlorine in said reaction zone being at least about 2.5:1; and
(d) recovering said gaseous mixture from said reaction zone.

FIG. 3 is a graph depicting the solubility of chlorine dioxide gas in aqueous solutions of NaOH.

Figure 1:
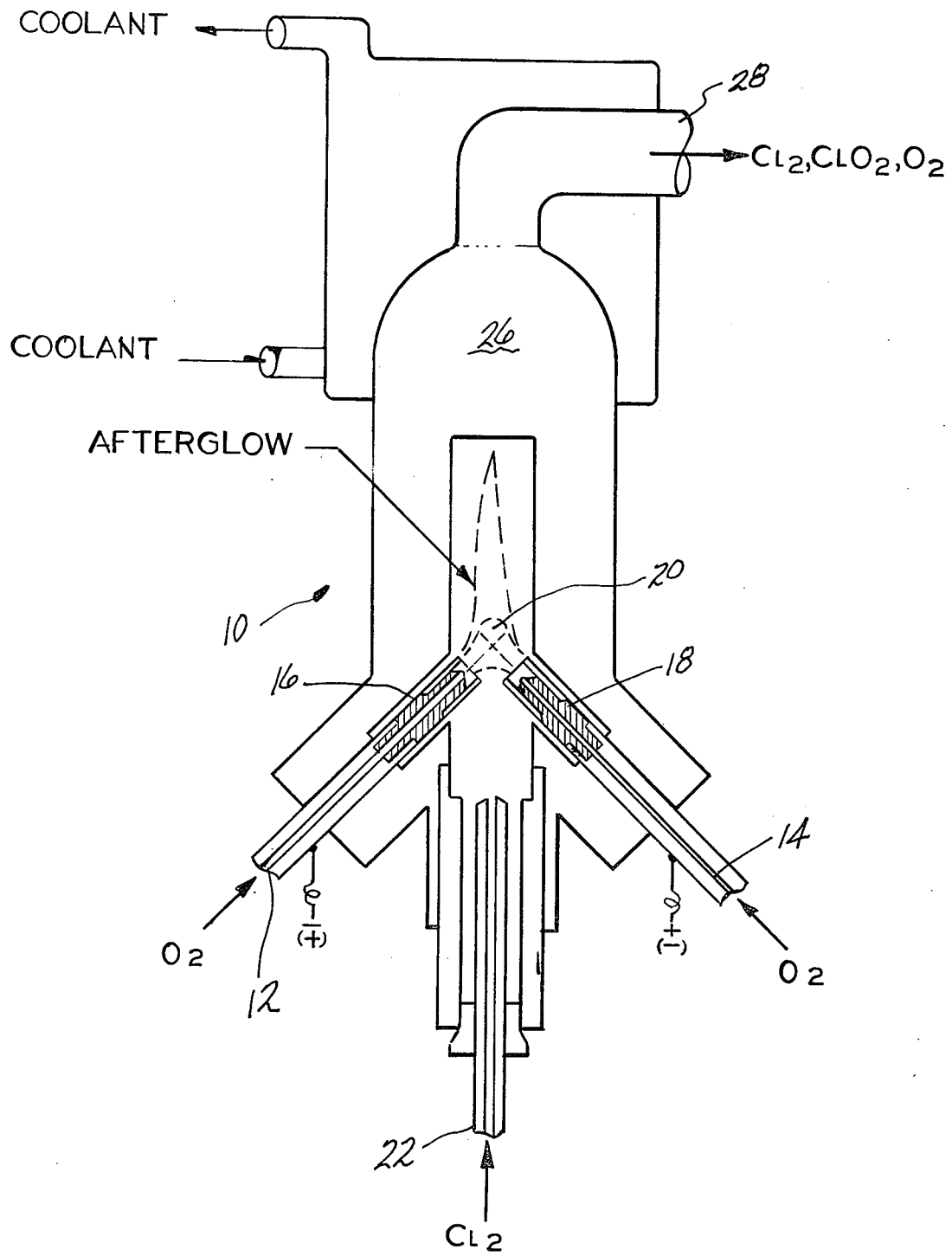
FIG. 1 is a schematic view of a plasma discharge reactor suitable for use in the process of the present invention.

Chlorine dioxide is synthesized directly by the reaction of chlorine gas with oxygen gas in a plasma generator such as shown in FIG. 1. Plasma generator 10 includes inlets 12 and 14 for oxygen gas which passes between electrodes 16 and 18 into reaction zone 20. Chlorine gas is introduced through inlet 22. The gaseous mixture of chlorine, chlorine dioxide, and oxygen, which is formed in reaction zone 20 is cooled in quenching zone 26 and removed through outlet 28.

Figure 2:
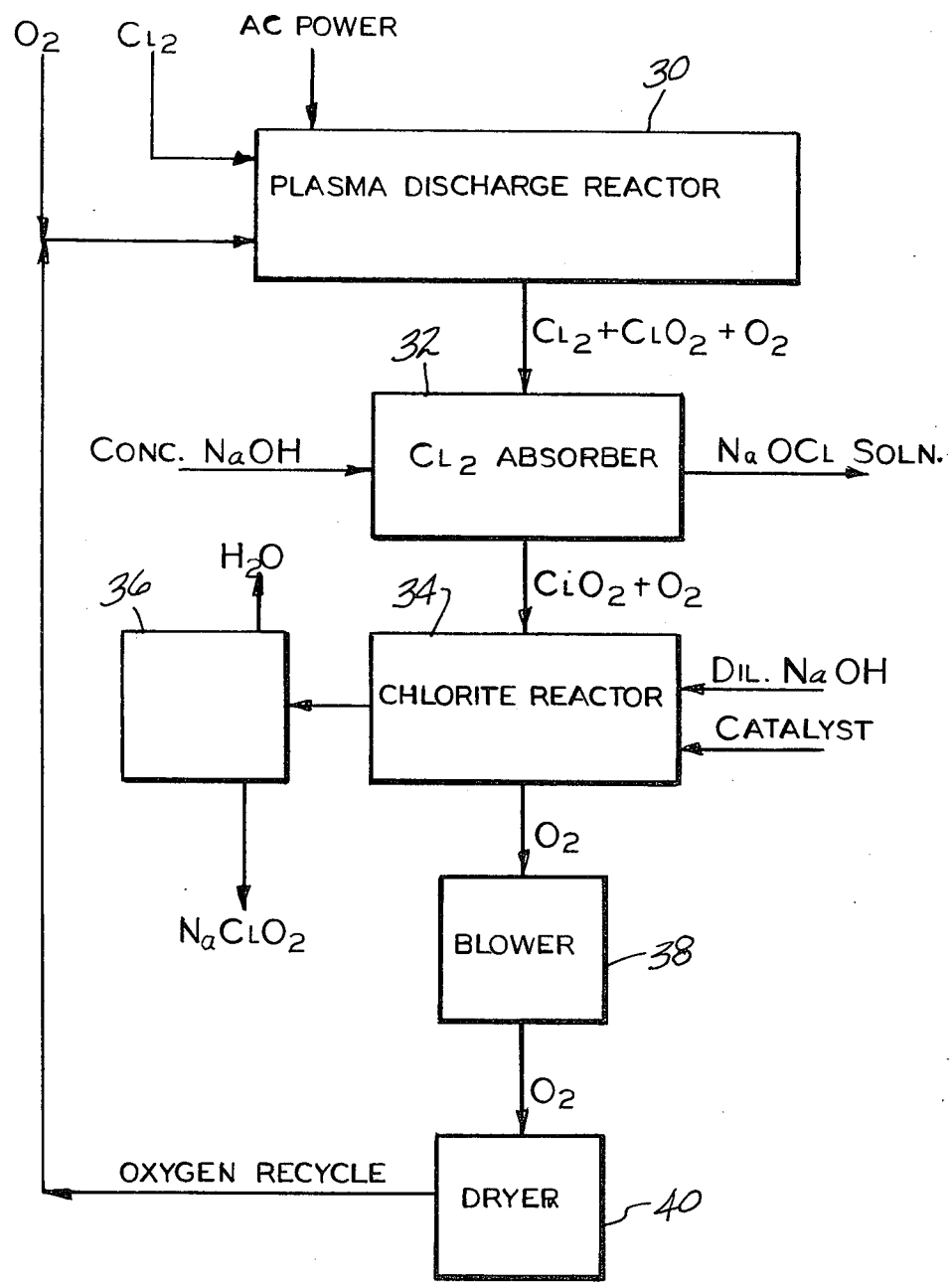
FIG. 2 is a flow diagram of one embodiment of the process of the present invention.

In the novel process of the present invention, as illustrated in the flow diagram of FIG. 2, oxygen gas is fed to plasma discharge reactor 30. Also fed to plasma discharge reactor 30 is an alternating current at a voltage sufficient to initially produce an arc between the electrodes and subsequently a plasma discharge. Chlorine gas is fed into the plasma discharge and a gaseous mixture of chlorine dioxide, chlorine, and oxygen is produced. The gaseous mixture is conveyed to $Cl_2$ absorber 32 containing a concentrated aqueous solution of an alkali metal hydroxide. Chlorine gas present in the mixture is absorbed in the aqueous solution of alkali metal hydroxide to produce a solution of an alkali metal hypochlorite. A gaseous mixture containing chlorine dioxide and oxygen from chlorine absorber 32 is conveyed to chlorite reactor 34 which contains as the absorbent a dilute aqueous solution of an alkali metal hydroxide and a catalyst. Chlorine dioxide present in the mixture is reacted with the dilute aqueous alkali metal hydroxide solution to produce an aqueous slurry of an alkali metal chlorite. The alkali metal chlorite slurry is continuously removed and conveyed to concentrator 36 in which the slurry is concentrated by evaporating water and the solid alkali metal chlorite separated. A gaseous mixture comprised of oxygen is conveyed from second absorber 34 to blower 38 for return to plasma discharge reactor 30. In a preferred embodiment, the gaseous mixture is passed through dryer 40 prior to its return to plasma discharge reactor 30.

In the novel process of the present invention, oxygen gas is passed between the anode and cathode. The electrodes conduct an alternating current at a voltage suitable for generating an initial arc between them which becomes a high temperature plasma discharge after the oxygen gas becomes sufficiently ionized to form a plasma. Chlorine gas is introduced into the reaction zone where it dissociates and reacts with oxygen in the plasma to form a gaseous mixture containing chlorine dioxide, chlorine, and oxygen. The gaseous mixture then passes through a quenching zone where it is cooled before removal from the outlet of the plasma generator.

An electrically conductive inert gas such as argon, neon, helium, krypton, xenon, radon, or mixtures thereof may also be used to produce the plasma discharge. The electrically conductive inert gas is employed, for example, where cooling the electrodes is desirable. A mixture of oxygen gas and the electrically conductive inert gas is fed between the electrodes to form the plasma discharge. The gaseous mixture produced in the plasma reaction zone will also contain the electrically conductive inert gas which is recycled to the plasma generator in a gaseous mixture with oxygen. Argon is a preferred embodiment of an electrically conductive inert gas.

To recover chlorine dioxide from the gaseous mixture as a gas or in the form of an alkali metal chlorite, the gaseous mixture is treated by one of several methods.

Surprisingly, substantially all of the chlorine gas in the mixture can be removed by passing the mixture through a concentrated aqueous solution of an alkali metal hydroxide such as sodium hydroxide having a concentration by weight of NaOH of at least 20%, preferably from about 25 to about 50%, and more preferably from about 30 to about 40%.

In this concentrated hydroxide solution, chlorine present in the mixture reacts with the sodium hydroxide to form a solution of sodium hypochlorite. As shown in FIG. 3, only minor amounts of chlorine dioxide are absorbed by the concentrated aqueous solutions of NaOH. Similarly, the oxygen and any inert gas present in the mixture are not absorbed by concentrated NaOH. The gaseous mixture recovered from the concentrated NaOH solution is then comprised of chlorine dioxide, oxygen and, where present, an inert gas.

In one embodiment of the process of the present invention, the chlorine dioxide in the gaseous mixture is recovered as an alkali metal chlorite such as sodium chlorite or potassium chlorite, with sodium chlorite being a preferred product. Sodium chlorite is a commercially available product produced by known processes such as those of U.S. Pat. Nos. 2,092,944–5, issued Sept. 14, 1937, to G. P. Vincent or those described by J. Masschelein in "Chlorine Dioxide", Ann Arbor Science Publ., Ann Arbor, Mich., 1979, pp. 130–135. Sodium chlorite is suitably produced by passing the second gaseous mixture into a second reactor containing a dilute solution of sodium hydroxide and reacted with a reducing agent in the presence of an inorganic catalyst such as carbon, an alkali metal amalgam, such as sodium amalgam, or an inorganic peroxide including hydrogen peroxide and sodium peroxide. The chlorine dioxide present in the gaseous mixture reacts to form solid sodium chlorite.

As shown in FIG. 2, the sodium chlorite is conveyed to concentrator 36 and the remaining oxygen-containing gaseous mixture returned to the plasma discharge reactor 30. In a preferred embodiment, the oxygen-containing gaseous mixture is passed through a dryer prior to its return to the plasma generator.

In another embodiment, the gaseous mixture of $ClO_2$ and $O_2$ are conveyed from $Cl_2$ absorber 32 to a second absorber (not shown) containing a liquid such as water or carbon tetrachloride, with water being preferred. The chlorine dioxide is absorbed by the liquid and separated from the oxygen-containing gaseous mixture. Chlorine dioxide is recovered as a gas by flashing or blowing it out of the liquid.

As previously stated, chlorine gas and oxygen gas are admixed and reacted in the plasma discharge to form chlorine dioxide. Suitable mixtures include those having a molar ratio of oxygen to chlorine of at least about 2.5:1. While molor ratios up to about 600:1 may be employed, little chlorine dioxide is produced at these high oxygen to chlorine ratios. Preferred molar ratios are those of about 100:1 to 500:1 and more preferably from about 250:1 to about 300:1. To obtain suitable chlorine dioxide conversion rates in the plasma reaction zone, it is necessary to control the holdup time for the gaseous mixture in the plasma discharge. Where high holdup times are employed, the percentage of conversion for chlorine dioxide is low as it is believed that the chlorine dioxide produced is decomposed before leaving the plasma reaction zone. At very low holdup times, it is believed that the chlorine and oxygen are fed into the plasma faster than they can react and the percent of conversion falls. Suitable holdup times for obtaining desirable conversion rates to chlorine dioxide include those of from about 0.05 to about 0.50 preferably from about 0.10 to about 0.30, and more preferably from about 0.12 to about 0.20 minutes.

The electric plasma discharge combustion process for chlorine dioxide is carried out at substantially atmospheric pressure, although higher or lower pressures may be employed, if desired. The reaction temperatures provided by the plasma are in the range of from about 500° to about 2000° and preferably from about 700° to about 1550° C., and more preferably from about 800° to about 1100°.

Any suitable plasma generator may be employed as a reaction zone in carrying out the novel process of the present invention. The plasma generator may employ as electrodes any material which will not react with chlorine or oxygen gases at the temperatures generated in the plasma discharge, but will conduct electric current. Suitable electrode materials include graphite, and conductive ceramics such as $SiO_2$-based glasses (e.g. borosilicate glasses), alumina, boron carbide, zirconium oxide (particularly fully stabilized $ZrO_2$), niobium carbide and niobium nitride, as well as ceramic composites including alumina and $ZrO_2$ (fully stabilized), alumina and boron nitride, boron carbide and carbon fibers, and glass and SiC fibers; transition metals including V, Cr, Mn, Fe, Co, Ni, Nb, Mo, Ta, W and their oxides; platinum group metals, platinum group metal oxides and bismuth trioide doped with cobalt oxides and manganese oxides. Preferably these conductive ceramics, ceramic composites, transition metals and their oxides, and platinum group metals and their oxides are employed as thick film conductors encapsulated in glass. Preferred as electrode materials are graphite and $SiO_2$ based glasses as conductive ceramics.

The electrodes are spaced apart at a distance suitable for generating the arc required for the plasma discharge. These distances include those, for example, from about 0.125 to about 1.25. The electrodes may be positioned directly opposite each other, parallel to each other or preferably, as illustrated in FIG. 1, at angular positions. Suitable angles measured from the horizontal, are from about 20° to about 60° and preferably from about 35° to about 50°. The electrodes are connected to a power source which supplies an alternating electric current at voltages of at least about 7 kilovolts and preferably from about 7 to about 50 kilovolts to generate the electric arc.

The novel process of the present invention will be illustrated by the following Example without any intention of being limited thereby.

EXAMPLE

A plasma generator of the type illustrated in FIG. 1 was comprised of a quartz tube having 2 hollow rod graphite electrodes, each positioned at an angle 45° to the horizontal, and with a gap of 0.75 of an inch. An alternating current power source supplied the electrodes with a 30 milliampere current at a voltage of 16.25 kilovolts to produce an electric arc between the electrode. Argon gas was supplied to the 2 hollow graphite electrodes into the arc zone to produce the plasma discharge. A mixture of oxygen and chlorine gas at a molar ratio of about 250:1 was supplied to and passed through the center of the apparatus directly into the plasma discharge. The reaction, conducted at atmospheric pressure resulted in a glowing discharge at a temperature of 875° C. and producing a blue-white configuration with a feathered luminous flame, sparkling on the electrode surfaces and glowing in the gas phase. The gas mixture was supplied at various flow rates by passing $Cl_2$ and $O_2$ through calibrated rotameters and the holdup time for the gaseous mixture in the plasma determined. The gaseous mixture of chlorine dioxide, chlorine, oxygen and argon produced passed through a quench zone cooled by water at subambient temperatures. After cooling, the gaseous mixture was passed through a flask containing a 35% solution of sodium hydroxide which removed the chlorine gas present. The mixture of chlorine dioxide, oxygen and argon was then passed into a series of scrubbers containing ice water. The conversion of chlorine to chlorine dioxide was determined by direct spectrophotometric analysis (Perkin Elmer Spectrophotometer 330). The percent conversion of chlorine to chlorine dioxide during the reaction is given in Table 1.

TABLE 1

| ELECTRIC PLASMA DISCHARGE COMBUSTION SYNTHESIS Chlorine Dioxide from Chlorine and Oxygen in Argon Plasma | |
| --- | --- |
| Hold Up Time For Gaseous Mixture of $Cl_2$ and $O_2$ in Plasma Discharge (in minutes) | % Conversion of $Cl_2$ to $ClO_2$ |
| .114 | 35 |
| .137 | 56.2 |
| .150 | 68.84 |
| .153 | 83.14 |
| .162 | 69.4 |
| .187 | 45 |
| .229 | 28.7 |
| .242 | 26.6 |
| .258 | 23.0 |

What is claimed is:

1. A process for the production of chlorine dioxide which comprises:
   (a) feeding oxygen gas to a reaction zone;
   (b) applying an electrical discharge at a voltage of at least 7 kilovolts to said oxygen gas to produce a high temperature plasma;
   (c) supplying chlorine gas to said reaction zone and reacting said chlorine gas with said oxygen gas in said plasma to produce a gaseous mixture comprised of chlorine dioxide, chlorine, and oxygen, the molar ratio of said oxygen to said chlorine in said reaction zone being at least about 2.5:1; and
   (d) recovering said gaseous mixture from said reaction zone.

2. The process of claim 1 in which the temperature of said plasma is in the range of from about 500° to about 2000° C.

3. The process of claim 2 in which the holdup time for said gaseous mixture in said plasma is in the range of from about 0.05 to about 0.50 minute.

4. The process of claim 3 in which said recovered gaseous mixture is fed into a concentrated solution of an alkali metal hydroxide to react with said chlorine to produce a solution of an alkali metal hypochlorite and a second gaseous mixture comprised of chlorine dioxide and oxygen, said concentration of alkali metal hydroxide in said solution being at least 20 percent by weight.

5. The process of claim 4 in which said second gaseous mixture is fed into a reaction mixture comprised of alkali metal hydroxide and a catalyst to produce a slurry of an alkali metal chlorite and a third gaseous mixture comprised of said oxygen gas.

6. The process of claim 4 in which said alkali metal hydroxide is at a concentration in the range of from about 25 to about 50 percent by weight.

7. The process of claim 6 in which said alkali metal hydroxide in said concentrated alkali metal hydroxide solution is selected from the group consisting of sodium hydroxide and potassium hydroxide.

8. The process of claim 7 in which said molar ratio of said oxygen to said chlorine is from about 250:1 to about 400:1.

9. The process of claim 8 in which said electrical discharge is at a voltage in the range of from about 7 to about 50 kilovolts.

10. The process of claim 9 in which said holdup time is in the range of from about 0.10 to about 0.30 minute.

11. The process of claim 5 in which said third gaseous mixture is returned to said reaction zone.

12. The process of claim 3 in which an electrically conductive inert gas selected from the group consisting of argon, neon, helium, krypton, xenon, radon and mixtures thereof, is supplied to said reaction zone.

13. The process of claim 12 in which said inert gas is argon.

14. The process of claim 3 in which said reaction zone contains electrodes selected from the group consisting of graphite, conductive ceramics, transition metals and their oxides, and platinum group metals and their oxides.

15. The process of claim 14 in which said electrodes are graphite or conductive ceramics.

16. A continuous process for the production of chlorine dioxide which comprises:
   (a) feeding oxygen gas to a reaction zone;
   (b) applying an electrical discharge at a voltage of at least 7 kilovolts to said oxygen gas to produce a high temperature plasma;
   (c) supplying chlorine gas to said reaction zone and reacting said chlorine gas with said oxygen gas in said plasma to produce a gaseous mixture comprised of chlorine dioxide, chlorine, and oxygen, the molar ratio of said oxygen to said chlorine in said reaction zone being at least 2.5:1;
   (d) feeding said gaseous mixture into a concentrated solution of an alkali metal hydroxide to react with said chlorine to produce a solution of an alkali metal hypochlorite and a second gaseous mixture comprised of chlorine dioxide, and oxygen said concentration of alkali metal hydroxide in said solution being at least 20 percent by weight;

(e) feeding said second gaseous mixture to an absorption zone containing a liquid for absorbing said chlorine dioxide gas and to produce a third gaseous mixture comprised of said oxygen gas;
(f) removing said third gaseous mixture from said absorption zone; and
(g) recovering said chlorine dioxide gas from said liquid.

17. The process of claim 16 in which said liquid is selected from the group consisting of water and carbon tetrachloride.

18. The process of claim 17 in which said liquid is water.

19. A continuous process for the production of an alkali metal chlorite which comprises:
(a) continuously feeding oxygen gas to a reaction zone;
(b) applying an electrical discharge at a voltage of at least 7 kilovolts to said oxygen gas to produce a high temperature plasma;
(c) continuously supplying chlorine gas to said reaction zone and reacting said chlorine with said oxygen to produce a gaseous mixture comprised of chlorine dioxide, chlorine and oxygen, the molar ratio of said oxygen to said chlorine in said reaction zone being at least about 2.5:1;
(d) continuously recovering said gaseous mixture from said reaction zone;
(e) continuously feeding said recovered gaseous mixture into a concentrated aqueous solution of an alkali metal hydroxide to react with said chlorine to produce a solution of an alkali metal hypochlorite and a second gaseous mixture comprised of chlorine dioxide and oxygen, said concentration of alkali metal hydroxide in said solution being at least 20 percent by weight;
(f) continuously feeding said second gaseous mixture into a reaction mixture comprised of a dilute aqueous solution of an alkali metal hydroxide and a catalyst to react with said chlorine dioxide to produce a slurry of an alkali metal chlorite and a third gaseous mixture comprised of said oxygen gas;
(g) continuously recovering said slurry of an alkali metal chlorite; and
(h) continuously recycling said third gaseous mixture to said reaction zone.

20. The process of claim 19 in which said alkali metal chlorite is selected from the group consisting of sodium chlorite and potassium chlorite.

21. The process of claim 20 in which said alkali metal in said concentrated aqueous solution of alkali metal hydroxide and said dilute aqueous solution of alkali metal hydroxide is sodium.

22. A process for the recovery of chlorine dioxide from gaseous mixtures comprised of chlorine dioxide and chlorine, said process which comprises contacting said gaseous mixture with a concentrated aqueous solution of an alkali metal hydroxide, reacting said chlorine with said concentrated aqueous alkali metal hydroxide solution to produce an alkali metal hypochlorite solution and chlorine dioxide gas substantially free of chlorine, said concentration of alkali metal hydroxide in said aqueous solution being at least 20 percent by weight; and recovering said chlorine dioxide gas.

* * * * *